United States Patent
Cha et al.

(10) Patent No.: US 7,295,514 B2
(45) Date of Patent: Nov. 13, 2007

(54) METHOD OF CONTROLLING CALL ADMISSION IN A MOBILE COMMUNICATION SYSTEM

(75) Inventors: Hwa Joon Cha, Anyang-si (KR); Jin Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 868 days.

(21) Appl. No.: 10/730,027

(22) Filed: Dec. 9, 2003

(65) Prior Publication Data

US 2004/0141479 A1    Jul. 22, 2004

(30) Foreign Application Priority Data

Dec. 11, 2002   (KR) ...................... 10-2002-0078849

(51) Int. Cl.
*G01R 31/08* (2006.01)
*H04J 1/16* (2006.01)
*H04L 1/00* (2006.01)

(52) U.S. Cl. ...................... 370/230; 370/329; 370/336; 370/443; 370/444; 370/437; 370/335; 370/468; 370/465; 370/229; 370/231; 370/232; 370/233; 455/450; 455/446; 455/452.1; 455/447

(58) Field of Classification Search .................... None
See application file for complete search history.

(56) References Cited

U.S. PATENT DOCUMENTS

| 6,477,157 B1 * | 11/2002 | Kim et al. ................ 370/331 |
| 6,928,289 B1 * | 8/2005 | Cho et al. ................ 455/452.2 |
| 6,975,609 B1 * | 12/2005 | Khaleghi et al. ........... 370/335 |
| 7,218,630 B1 * | 5/2007 | Rahman ................... 370/355 |

* cited by examiner

*Primary Examiner*—Raj K. Jain
(74) *Attorney, Agent, or Firm*—Ked & Associates, LLP

(57) ABSTRACT

A system and method for controlling call admission control in a mobile communication system enables call admission control function to be conducted in a forward link of the mobile communication system. The call admission control method includes a call admission control process, in which voice calls and data calls are distinguished from each other, minimum resource availability is checked, a voice call priority function is conducted, and a maximum supplemental channel (SCH) for the data call is established. According to this process QoS (Quality of Service) for all users is satisfied to the greatest extent and the occurrence of call reject and call drop of voice calls and data calls are reduced. Further, the voice call priority may be guaranteed and the database related to the call admission control may be adjusted easily by the system operator according to the relevant cell environment.

13 Claims, 6 Drawing Sheets

METHOD OF CONTROLLING CALL ADMISSION IN A MOBILE COMMUNICATION SYSTEM

BACKGROUND OF THE INVENTION

1. Field of the Invention

The present invention generally relates to communication systems, and more particularly to a call admission in a mobile communication system.

2. Background of the Related Art

FIG. 1 shows a related-art mobile communication system, comprising a mobile station 10, a base station 20, and a control station 30. The base station comprises a radio frequency (RF) unit 21, a modem unit 22, and a base station processor 23. The RF unit 21 performs an RF transmission function, transmission path check function, and transmission filter function. The modem unit 22 processes CDMA (Code Division Multiple Access) digital base band signals. And, the base station processor 23 serves as the main processor within the base station, performing the function of conducting initialization of the base station, a call process function, and the function of assigning and releasing network and radio resources.

In the related-art mobile communication system described above, users require similar levels of quality of service (QoS) mainly for voice services. Accordingly, the requested amount of network and radio resources would be similar and thus the QoS of most users could be satisfied. Therefore, the call admission control function has been conducted simply based upon the existence of available resources.

The above-mentioned call admission control function means the function of limiting the number of admitted users upon considering the condition of almost all the resources required for performing call connection such as network, radio capacity, modem, power, etc. By conducting call admission control, the QoS of users who have already been active in the base station can be ensured and voice calls that newly arise can be accommodated to the maximum level.

However, as technology progressed, the QoS required by voice users and data users became different in a mobile communication system that simultaneously provides services for voice calls and data calls, and thus frequently there are occasions where the QoS of certain users cannot be satisfied. For example, if there are connections for a large number of data calls, for which comparatively a large amount of network and radio resources are required and the required amount changes frequently, voice calls which should be primarily served would often be rejected in such a mobile communication system.

Further, if a number of voice calls are assigned to a specific frequency assignment (FA), call reject may occur for data calls in the corresponding frequency in such a mobile communication system. Here, call reject means the rejection of an attempt for a call connection for various reasons. In most cases, call reject occurs due to radio problems or failure in processing calls or assigning resources within the system.

In short, where there were only voice calls in the mobile communication system of the related art, no particularly detailed call admission control function was required because the QoS of one voice call was same as the QoS of other voice calls. In contrast, in a mobile communication system which accommodates voice calls and data calls at the same time, a more detailed call admission control function is required.

In mobile communication systems of the related art that accommodate voice calls and data calls at the same time, call admission control has not been conducted actively with regard to voice calls or data calls. Further, the priority of voice calls over data calls has not been taken into consideration. Thus, if a number of data calls were made for a specific sector/FA and if there is no sufficient resource to be assigned for a voice call, the voice call cannot be connected and further no new data calls can be connected.

Moreover, for data calls having some unique features, the simple call admission control function provided by the related art would complicate or make it difficult to implement the process of satisfying QoS demanded by users. More specifically, because QoS of data calls would be different depending on the type of required services, radio and network resource demand would be different accordingly. This complicates the call admission control process.

SUMMARY OF THE INVENTION

An object of the present invention is to solve at least one of the above problems and/or disadvantages and to provide one or more of the advantages described hereinafter.

Another object of the present invention is to provide a system and method for controlling call admission in a mobile communication system, wherein a call admission control function is performed in the forward link of the mobile communication system.

Another object of the present invention to implement a call admission control function within a call processor of a base station in a mobile communication system and thus to accommodate as many calls as possible while guaranteeing a desired level of QoS for each call when there are various types of calls (e.g., voice calls and data calls of different rates). In this manner, the call reject rate may be substantially decreased.

Another object of the present invention is to guarantee voice call priority a call processor within a base station of a mobile communication system and to enable the system operator to adjust and use a database related to the call admission control according to a relevant cell environment.

Another object of the present invention is to implement call admission control in a manner which is appropriate and active in complicated situations which may arise in a mobile communication system. Thus, through available resources, the QoS for each type of call may be guaranteed and calls may be accommodated to a predetermined and preferably a maximum extent. At the same time, by prioritizing voice calls over data calls, the present invention raises the voice call connection rate and accommodates as many data calls as possible.

To achieve these and other objects and advantages, the present invention provides a call admission control method in a mobile communication system comprising a call admission control process wherein a call arising in the mobile communication system is determined whether it is a voice call or a data call and it is checked whether the minimum resources are available, and then the voice call priority guarantee function is conducted and the maximum supplemental channel (SCH) is assigned for the data call.

Preferably, if there is no available resource for the voice call, the call admission control process generates extra resources by reducing the transmission rate of a data call which has already been connected and accommodates the voice call with the extra resources, and for the data call, generates extra resources by, while maintaining the minimum transmission rate of the SCH designated for the relevant data call, reducing the transmission rate of another data call and establishes the maximum SCH connection with said generated extra resources.

The call admission control process preferably further comprises: checking whether a call that arose in the mobile communication system is a voice call, determining whether there are available modem resources in the FA to be used in between the relevant mobile station and the base station and then assigning the FA accordingly; checking extra capacity in the radio band for the relevant sector/FA and conducting the call admission check accordingly; and upon the completion of the call admission check, assigning resources according to the determined state of resource availability and thus establishing the connection for the fundamental channel (FCH) between the mobile station and the base station and establishing the connection for the voice call.

The call admission check preferably comprises: specifying the transmission rate among QoS parameters to be used in the call admission check as the basic transmission rate of the FCH; determining whether to conduct the admission power control by referring to the database related to the call admission control and conducting the admission power control accordingly; and controlling the admission maximum transmission rate so that it would not exceed the maximum data rate of the relevant sector/FA by referring to the database related to the call admission control.

The database related to the call admission control comprises forward link power control flag, forward link power capacity, forward link minimum data transmission rate and forward link maximum transmission rate. The database may be adjusted according to the cell environments.

Alternatively, the call admission control process comprises: checking whether a call that arose in the mobile communication system is a data call, determining whether there are available modem resources in the FA to be used in between the relevant mobile station and the base station and then assigning the FA accordingly; checking extra capacity in the radio band for the relevant sector/FA and conducting the call admission check accordingly; upon the completion of the call admission check, assigning resources according to the determined state of resource availability and thus establishing the FCH and the voice call connection between the mobile station and the base station; conducting the call admission control, in which the maximum assignable value for the requested data transmission rate is determined in accordance with call admission control parameters; and assigning SCH resources at the data transmission rate determined by said call admission control and thus establishing the data call connection between the mobile station and the base station.

The call admission check preferably comprises: specifying the transmission rate among QoS parameters to be used in the call admission check as the basic transmission rate of the FCH plus the minimum data transmission rate of the forward link in the database related to the call admission control; determining whether to conduct the admission power control by referring to the database related to the call admission control and conducting the admission power control; and controlling the admission maximum transmission rate so that it would not exceed the maximum data rate of the relevant sector/FA by referring to the database related to the call admission control.

The call admission control function preferably further comprises: determining whether to conduct the admission power control by referring to the database related to the call admission control and conducting the admission power control accordingly; controlling the admission maximum transmission rate so that it would not exceed the maximum data rate of the relevant sector/FA by referring to the database related to the call admission control; controlling the minimum SCH transmission rate so that the minimum SCH data transmission rate may be assignable by referring to the database related to the call admission control; checking whether there exist channelization resources that may be assigned and if there is no relevant channelization resource, searching for maximum assignable channelization resources and controlling the channelization code so that such resources may be assigned; and checking whether there exist assignable modem resources and if there is no relevant modem resource, searching for maximum assignable modem resources and controlling the modem so that such resources may be assigned.

Alternatively, if there are no available modem resources in the FA at which the mobile station made or received a call or if said call admission check fails, the call admission control process further comprises searching for an FA which has the least load and assigning such FA.

The admission power control comprises: calculating the total power that is available at the link and determining the traffic available power that is available as the traffic channel by using said total power; checking whether said traffic available power is not less than the average power of channels multiplied by the user request transmission rate and thus examining whether the user request power may be assigned; and if the user request power cannot be assigned, finding the maximum assignable rate while reducing said user request transmission rate and thereby determining the minimum transmission rate for the relevant user attempting the assignment.

The admission maximum transmission rate control comprises: checking whether the user request transmission rate exceeds the maximum transmission rate of the forward link within the database related to the call admission control and thus checking whether it is possible to assign the user request transmission rate; if the user request transmission rate cannot be assigned, examining whether there are any other active SCH users and determining the minimum transmission rate of the user attempting the assignment; selecting one user from the user attempting to receive assignment and the other active SCH users and determining the selected user as the user whose transmission rate will be decreased and then determining the down transmission rate and thereby conducting the user transmission rate down process; checking again whether the maximum transmission rate of the forward link is exceeded by applying the down transmission rate determined according to the user transmission rate down process; and if the down transmission rate does not exceed the maximum transmission rate of the forward link, confirming that the down request is for the selected other active SCH user and performing the requested SCH transmission rate decrease and specifying the finally determined value as the transmission rate to be used by the user.

The determination of the minimum transmission rate is made by specifying the user request transmission as the minimum transmission rate in case of the FCH assignment, by specifying the lesser of the user request transmission rate and the minimum data transmission rate of the forward link among the data related to said all admission control as the minimum transmission rate in case of the SCH initial assignment, or by specifying the currently specified transmission rate as the minimum transmission rate in case of the SCH transmission rate change.

A call admission control method in a mobile communication system according to another preferred embodiment of the present invention comprises: checking at the time of the call connection request in the mobile communication system, whether the call is a data call request, determining whether there are available modem resources in the FA to be used in between the relevant mobile station and the base station and then assigning the FA accordingly; checking extra capacity in the radio band for the relevant sector/FA and conducting the call admission check accordingly; upon the completion of the call admission check, assigning resources according to the determined state of resource availability and thus establishing the connection for the fundamental channel (FCH) between the mobile station and the base station and establishing the connection for the voice call; conducting the call admission control, in which the maximum assignable value for the requested data transmission rate is determined in accordance with call admission control parameters; and assigning the SCH (Supplemental Channel) resources at the data transmission rate determined by said call admission control and thus establishing the data call connection between the mobile station and the base station.

A call admission control method in a mobile communication system according to another preferred embodiment of the present invention further comprises: at the time of the call connection request, if it is a voice call, determining whether there are available modem resources in the FA to be used in between the relevant mobile station and the base station and then assigning the FA accordingly; checking extra capacity in the radio band for the relevant sector/FA and conducting the call admission check accordingly; and upon the completion of the call admission check, assigning resources according to the determined state of resource availability and thus establishing the connection for the fundamental channel (FCH) between the mobile station and the base station and establishing the connection for the voice call.

DETAILED DESCRIPTION OF PREFERRED EMBODIMENTS

Figure 1:
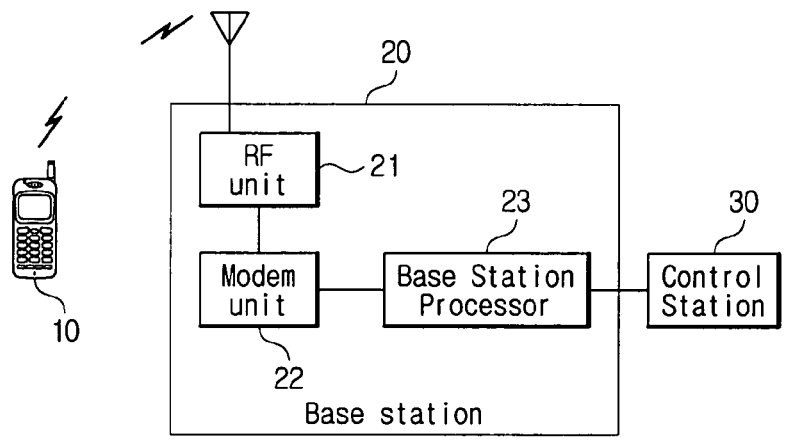
FIG. 1 is a block diagram illustrating the structure of a mobile communication system according to the related art.

A system and method for performing call admission control in a mobile communication system according to one or more embodiments of the present invention attempts to accommodate as many calls as possible while guaranteeing the QoS of each call. For connection of a call, it is determined whether the call connection is possible through assignment or confirmation of resources such as modem, frame offset, Walsh code, power, radio band capacity, etc.

In making this determination, control of the most critical forward radio band capacity is one concern. Radio band capacity is determined based on rate. For example, if the forward link capacity for a specific sector/FA is 45, the maximum rate that can be assigned to the forward link to guarantee ordinary QoS is the data rate of X 45. Here, the data rate identified by "X N" is 9.6 Kbps X N in Rate Set 1. In Rate Set 2, it is 14.4 Kbps X N. The maximum assignable rate for each sector/FA is set as the programmable loading data (PLD). The system operator may change this specification. Ordinarily, the data rate of X 45 is used for a sector/FA.

The call processor within the base station (base station processor), which conducts the call admission control function in the forward link, has a database related to the call admission control, which contains stored data for call admission control (e.g., PLD). The PLD database is a database that is constructed according to the structure of the base station and the operation data. For this purpose, the database receives information from the control station which is a higher level processor at the time when the base station is restarted.

In the base station processor, the forward link uses an antenna with a directivity feature and thus the call admission control function may be conducted for each sector/FA. Further, the base station processor enables the call admission control function through forward link call admission control factors such as radio resource, network resource, and QoS.

Walsh code and base station transmission power, etc., may be the radio resource factors. The channel element is one of the network resource factors. The minimum data rate is one of the QoS factors. The Walsh code is also referred to as the channelization code. The Walsh code is a radio band resource used in transmitting information at the CDMA system to a mobile station. Channels are separated by this Walsh code.

Further, the base station processor conducts the call admission control function in such a manner to guarantee the stable QoS of a voice call and satisfying the QoS of a data call at the same time. The priorities of calls are set in the following order: voice handoff call, voice normal call, and data call.

Specifically, a voice handoff call is accommodated without any condition if resources are available without conducting the call admission control function. For a voice normal call, the call admission control function is conducted and if resources are not assignable, the transmission rate for other existing data calls may be reduced. However, if there is no data call that has been already connected for or if the voice normal call may not be accommodated for some other reason, the FA is altered in order to prevent the call reject to the greatest extent possible. For a data call, the call admission control function is conducted and only the maximum assignable resources are assigned. In order to satisfy the minimum level of QoS, the transmission rate for other data calls may be reduced. However, if there is no data call that has been already connected for or if it is impossible to satisfy the minimum level of QoS, the FA is altered in order to prevent the call reject to the greatest extent possible.

The data related to call admission control is required for each sector/FA in order to conduct the call admission control function. The data related to call admission control is stored in the database related to the call admission control and, comprises forward link power control flag (FWD_POWER_CTRL_FLAG), forward link power capacity (FWD_POWER_CAPACITY), forward link minimum data transmission rate (FWD_MINIMUM_RATE) and forward link maximum transmission rate (FWD_MAX_RATE). The system operator may conveniently adjust and use the database related to call admission control in accordance with the cell environment.

If the forward link power control flag (FWD_POWER_CTRL_FLAG) is 0, it means that the forward link power excess capacity limitation has been disabled. If the forward link power control flag (FWD_POWER_CTRL_FLAG) is 1, it means that the forward link power excess capacity limitation has been enabled. The forward link power capacity (FWD_POWER_CAPACITY) indicates the threshold value of the forward capacity that may be used as the traffic channel and is expressed as the ratio, to the total transmission power, of the transmission power assigned to the overhead channel. The forward link minimum data transmission rate (FWD_MINIMUM_RATE) indicates the minimum data transmission rate of the forward link and the forward link maximum transmission rate (FWD_MAX_RATE) indicates the channel capacity of the forward link in the form of N times of the basic transmission rate.

Parameters for conducting the call admission control function comprise admission power control parameter, admission maximum transmission rate control parameter, minimum SCH transmission rate control parameter, Walsh code control parameter and forward modem control parameter.

In a system accommodating voice calls and data calls at the same time, the call admission control method in a mobile communication system according to a preferred embodiment of the present invention satisfies a minimum QoS which may be different for each type of call and gives priority to voice calls over data calls.

Figure 2:
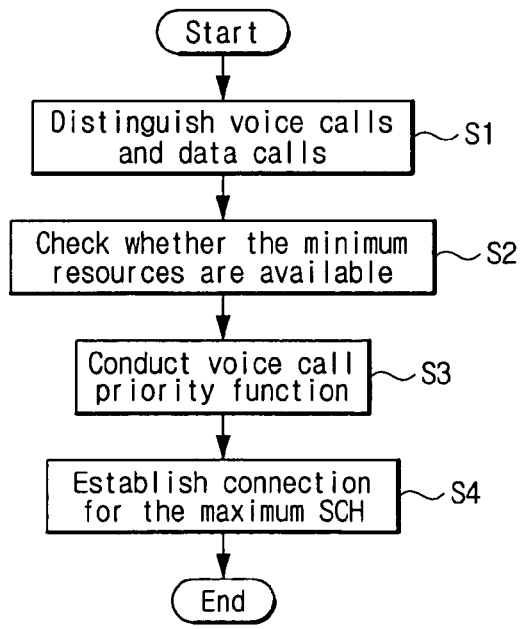
FIG. 2 is a flow chart illustrating a call admission control method in a mobile communication system according to a preferred embodiment of the present invention.

In order to obtain the features described above, as illustrated in FIG. 2, first, a call arising in the mobile communication system is distinguished as a voice call or a data call (S1). Then, the availability of minimum resources that should be guaranteed for each call is confirmed (S2).

At this time, in case of a voice call, upon checking whether there are available resources in the system, if there is no available resource, it is checked whether there are data calls already established in the relevant sector/FA. If there exist data calls established in the relevant sector/FA, the data transmission rate of a data call is reduced by one level to generate extra resources. Then, using the generated extra resources, a voice call priority function is conducted to accommodate the voice call (S3).

On the other hand, if a data call has arisen, the FCH connection is established. After the establishment of the FCH, if the base station receives an SCH connection request, the function of establishing the maximum available SCH in the specific sector/FA is conducted by using the extra resources generated through the reduction of the transmission rate of another data call, while guaranteeing the minimum transmission rate of the SCH as designated by the system operator. In this manner, the call admission control function guarantees a stable QoS for a voice call and satisfies the QoS of a data call as much as possible (S4).

Figure 3:
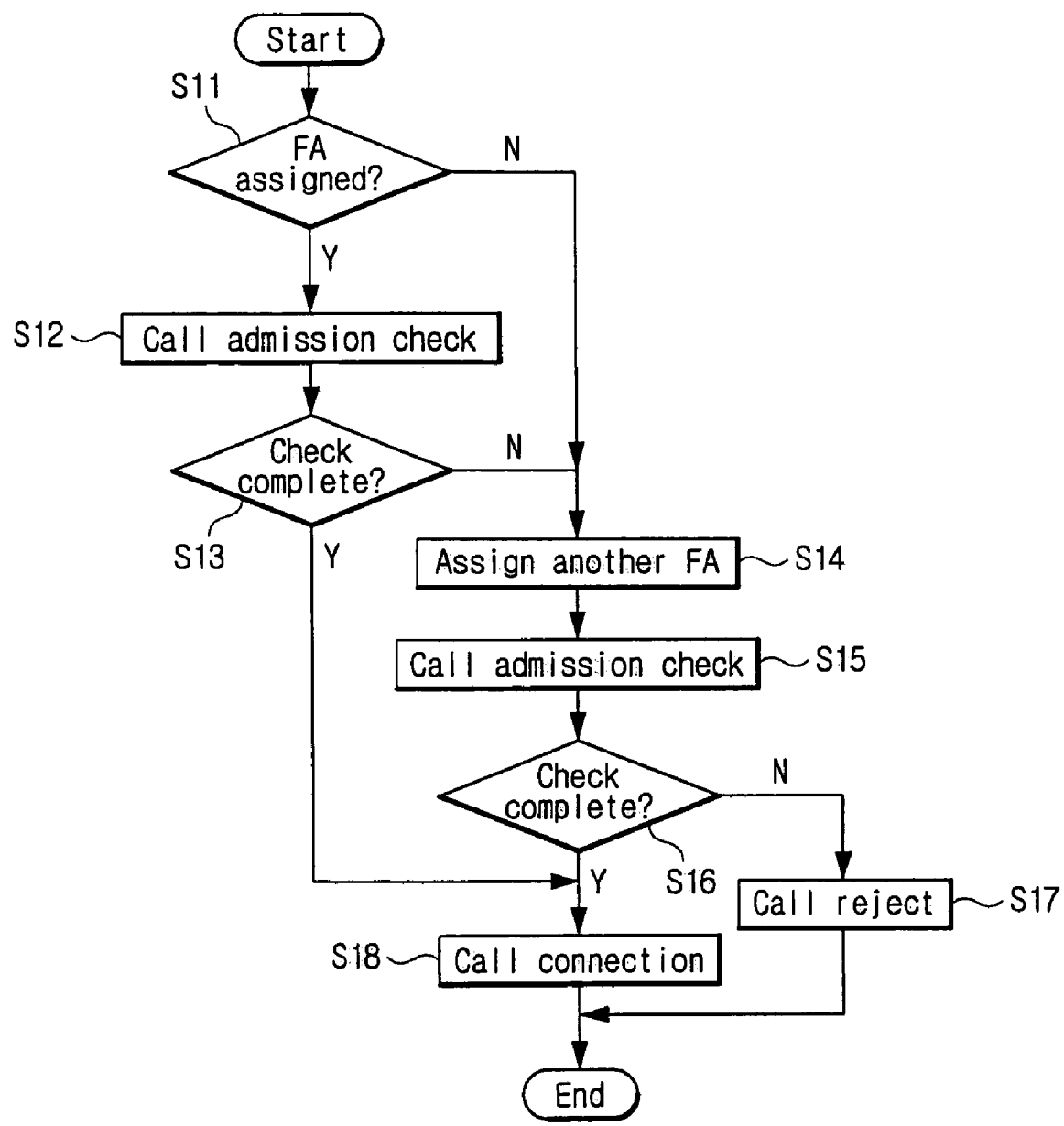
FIG. 3 is a flow chart illustrating the call admission control process of FIG. 2 in case of a voice call.
Figure 4:
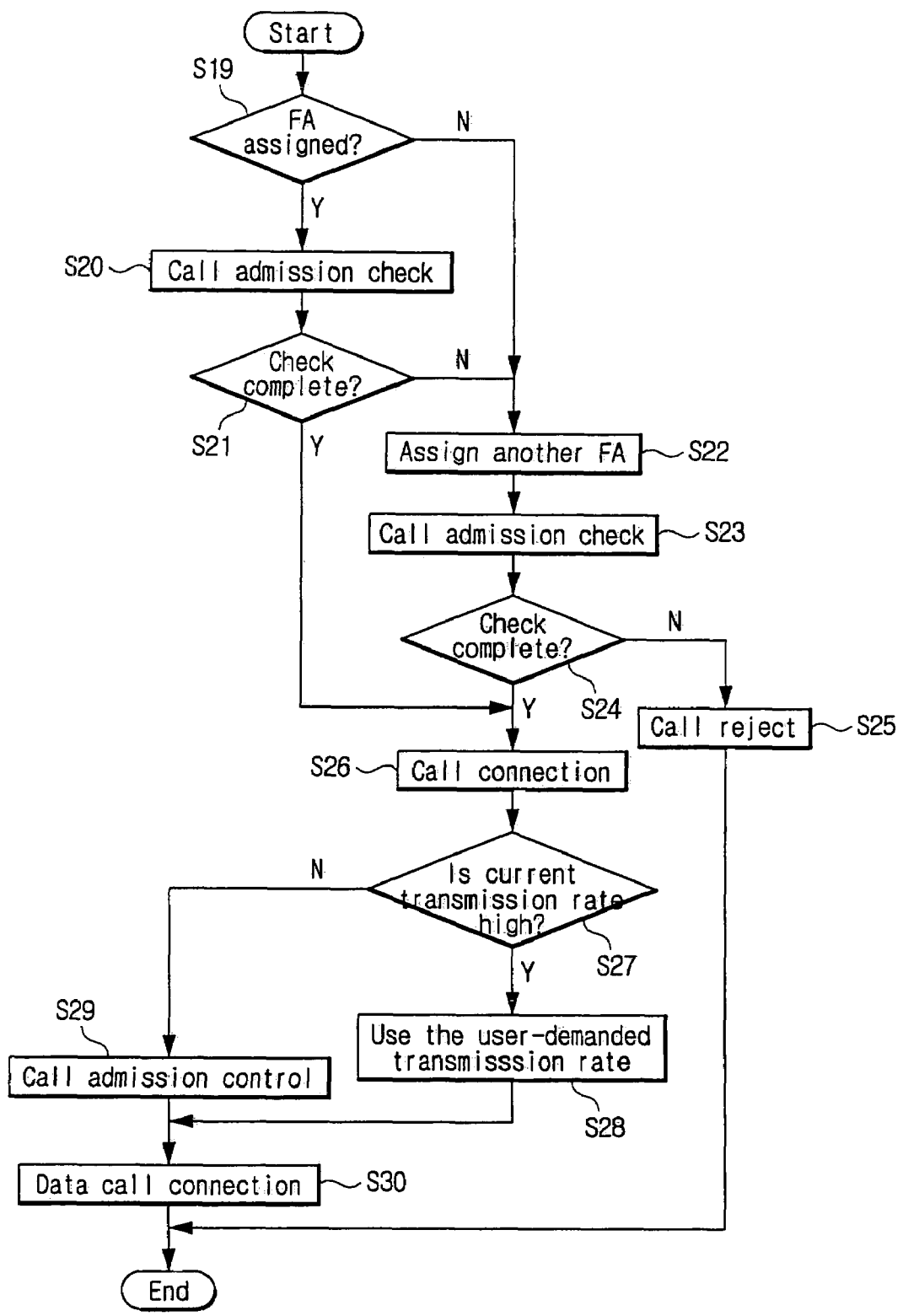
FIG. 4 is a flow chart illustrating the call admission control process of FIG. 2 in case of a data call.

FIGS. 3 and 4 show steps included in a call admission control method in a mobile communication system according to the present invention.

First, during the action of establishing the FCH/DCCH (Dedicated Control Channel) for a call arising in the mobile communication system, it is determined whether the call is a voice call or a high data rate call. More specifically, at the time of a call connection request, the mobile station transmits an origination message to the base station by using an access channel. (The access channel is a channel used for the mobile station's access to the relevant base station.) The origination message comprises a service option field which is used as a value for determining at the base station processor whether the call requested by the mobile station is a voice call or a data call. The base station processor checks the service option field of the origination message received from the mobile station and determines whether the call requested by the user is a voice call or a data call.

The call admission control action in a case where a call requested by the user is a voice call is as illustrated in FIG. 3.

First, the base station processor checks whether there are available modem resources in the FA to be used between the mobile station and the base station and then assigns the relevant FA accordingly (S11). At this time, the relevant FA would be the FA used for origination and receipt of the call by the mobile station.

FA assignment means the determination of frequency to be used between the mobile station and the base station. Elements that affect the frequency determination vary depending on whether there are available modem resources that may be used in the relevant frequency.

If the FA assignment is completed at step S11, the QoS parameters to be used in the call admission check regarding the assigned FA are determined and the call admission check is conducted according to said QoS parameters (i.e., according to the current status of extra radio band for the relevant sector/FA) (S12). Then, it is checked whether the call admission check has been completed (S13).

On the other hand, if the FA assignment fails at step S11 because there is no available modem resource to be used in the relevant FA or if the call admission check fails at step S13, the FA with the least load is searched for out of the other FAs and is assigned (S14). Preferably, the FA having the greatest amount of modem resources is selected out of the other FAs.

For example, the FA assignment in steps S11 and S14 is performed as follows in the cases set forth in table 1.

TABLE 1

| | Number of included modems | Number of modems in use | Number of available modems |
|---|---|---|---|
| FA1 | 20 | 6 | 14 |
| FA2 | 20 | 20 | 0 |
| FA3 | 20 | 8 | 12 |
| FA4 | 20 | 10 | 10 |

If the mobile station makes a call or receives a call through FA1, because there are modems available for use, the base station processor assigns FA1 at said step S11. Further, later if the call admission control function fails, the base station processor assigns FA1, which has the greatest number of modems within the base station, as the FA to be used between the mobile station and the base station at step S14.

If the mobile station makes a call or receives a call through FA2, because there is no modem available for use, the base station processor assigns FA1, which has the greatest number of modems within the base station, as the FA to be used between the mobile station and the base station at step S14.

Thereafter, QoS parameters to be used in the call admission check for the newly assigned FA1 are determined. Then, according to the QoS parameters (i.e., according to the checked status of the extra radio band capacity for the newly assigned sector/FA), the call admission check is conducted (S15). Thereafter, it is determined whether the call admission check has been completed (S16).

If it is determined at step S16 that the call admission check has failed, the voice call connection is suspended and thus the call is rejected (S17).

In contrast, if it is determined at steps S13 or S16 that the call admission check has been completed, the base station processor transmits the information relating to the origination or call receipt message to the control station. Then, upon receiving additional information concerning the call connection from the control station, The base station processor conducts the modem resource assignment and Walsh code assignment, thereby finally establishing the call connection between the mobile station and the base station (S18). Here, establishment of a call connection means the establishment of an FCH connection for a voice call. Thus, the voice call connection is finished.

There are the forward FCH and the reverse FCH in the FCH. The forward FCH is a channel used for transmission of information from the base station to the mobile station. The reverse FCH is a channel used for transmission of information from the mobile station to the base station.

Now, the call admission control action in a case where a call requested by the user is a data call is explained with reference to FIG. 4. After establishing the FCH connection as described above, the base station processor establishing the SCH connection. In other words, upon receiving an SCH connection request from the upper processor, the base station processor conducts the SCH admission control action. Here, the SCH is a channel used between the base station and the mobile station in a case where packet data is transmitted. In the SCH, the normal call and the handoff call are not distinguished but are processed as normal calls.

First, the base station processor checks whether there are modem resources available for use in the FA through which the mobile station makes or receives a call and assigns such FA accordingly (S19).

If the FA assignment is completed at step S19, QoS parameters to be used in the call admission check for the assigned FA are determined. Then, according to the QoS parameters (i.e., according to the checked status of the extra radio band capacity for the current sector/FA), the call admission check is conducted (S20). Thereafter, it is determined whether the call admission check has been completed (S21).

On the other hand, if the FA assignment fails at step S19 because there is no available modem resource to be used in the relevant FA or if the call admission check fails at said step S21, the FA with the least load is searched for out of the other FAs and is assigned (S22).

Thereafter, QoS parameters to be used in the call admission check for the newly assigned FA are determined. Then, according to the QoS parameters (i.e., according to the checked status of the extra radio band capacity for the newly assigned sector/FA), the call admission check is conducted (S23). Thereafter, it is determined whether the call admission check has been completed (S24).

If it is determined at the step S24 that the call admission check has failed, the data call connection is suspended and thus the call is rejected (S25).

In contrast, if it is determined at steps S21 or S24 that the call admission check has been completed, the base station processor transmits the information relating to the origination or call receipt message to the control station and then, upon receiving additional information concerning the call connection from the control station, conducts the modem resource assignment and Walsh code assignment, thereby establishing the call connection between the mobile station and the base station (S26). Here, establishment of a call connection means the establishment of an FCH connection for a voice call.

Then, the base station processor compares the current transmission rate with the user-demanded transmission rate (user request transmission rate) (S27). If the current transmission rate is greater than the user request transmission rate, the user-request transmission rate is used (S28).

On the other hand, if it is determined at step S27 that the current transmission rate is lower than the user request transmission rate, the base station processor conducts the call admission control to determine the maximum assignable value for the requested data transmission according to the relevant call admission control parameters (S29).

In other words, the call admission control is conducted only if the user request transmission rate is greater than the current transmission rate.

Then, at the user request transmission rate determined at step S28 or at the data transmission rate determined by the call admission control of step S29, the modem resource assignment and Walsh code assignment related to the SCH are conducted and thus the data call connection between the mobile station and the base station is finally established (S30).

Figure 5:
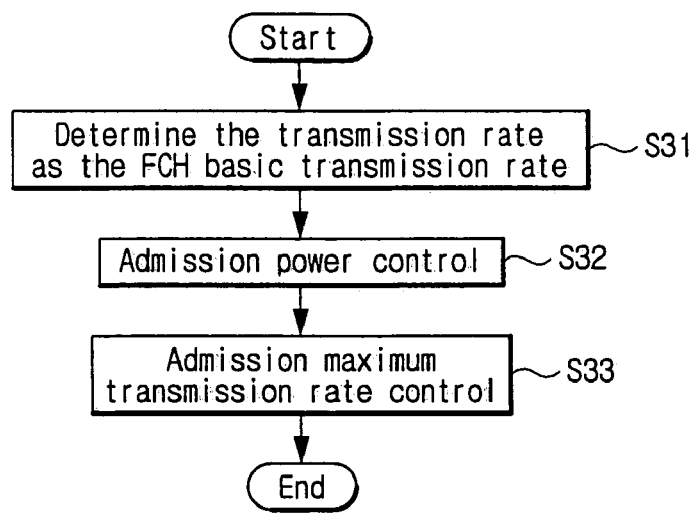
FIG. 5 is a flow chart illustrating the call admission check of FIG. 3 or FIG. 4 in case of a voice call.

FIG. 5 shows steps performed during a call admission check for the assigned FA (S12), the call admission check for the newly assigned FA (S15), and the call admission check for the newly assigned FA (S23) in accordance with the present invention.

First, of the QoS parameters to be used in the call admission check, the transmission rate is determined to be the FCH basic transmission rate (1X) (S31). Then, by checking the call admission control related data (e.g., PLD) stored in the database related to the call admission control, it is determined whether the admission power control is to be conducted according to the value of the forward link power control flag (FWD_POWER_CTRL_FLAG) within the data related to the call admission control. Thereafter, the admission power control is conducted by referring to the forward link power capacity (FWD_POWER_CAPACITY) among the data related to the call admission control (S32).

Here, the reason why only the FCH basic transmission rate (1X) is used as the transmission rate of the QoS parameters to be used in the call admission check is to prevent the call reject.

Thereafter, the admission maximum transmission rate control is conducted in a way not to exceed the maximum data rate of the sector/FA by using the forward link maximum transmission rate (FWD_MAX_RATE) among the data related to the call admission control.

More specifically, in case of a voice call, data rate X 1 (e.g., 9.6 Kbps X 1 or 14.4 Kbps X 1) is required as the forward radio band capacity for the FCH. Also, if a DCCH is established, data rate X 1 is used for this purpose. Thus, the forward link data rate for the call connection would be data rate X 2 (if the DCCH connection is established). After determining the data rate to be assigned for the call connection in this manner, it is checked whether the extra data rate is the same as or higher than the data rate required for the call connection. If the extra data rate is the same as or higher than the required data rate, the voice call connection is conducted.

In contrast, if the extra data rate is lower than the data rate required for the call connection, it is checked whether there are high rate data calls in the current sector/FA. If there exist high rate data calls, the data call with the highest data rate is selected and the transmission rate of such data call is decreased. At this time, it is checked whether the rate of the highest rate data call is higher than the SCH minimum data rate specified in the PLD and only if it is higher, the transmission rate of the high rate data call is decreased.

Then, it is determined whether the voice call connection may be established by using the excess data rate obtained through the above-described action. In other words, it is checked whether the voice call connection can be established with the excess data rate obtained by decreasing the data rate of the selected high rate data call, while maintaining the data rate of the high rate data call as the minimum data rate specified in the PLD.

If the voice call connection is possible with the excess data rate, a request is made to the base station processor so that the transmission rate of the selected high rate data call would be lowered and then the rest of the call connection action for the voice call is conducted.

If the excess data rate is lower than the data rate required for the voice call connection, if there is no high rate data call established in the current sector/FA, or if the high rate data call with the highest data rate is set as the minimum data rate of a high rate data call specified in the PLD, then the voice call connection is suspended and thus a call reject occurs.

Figure 6:
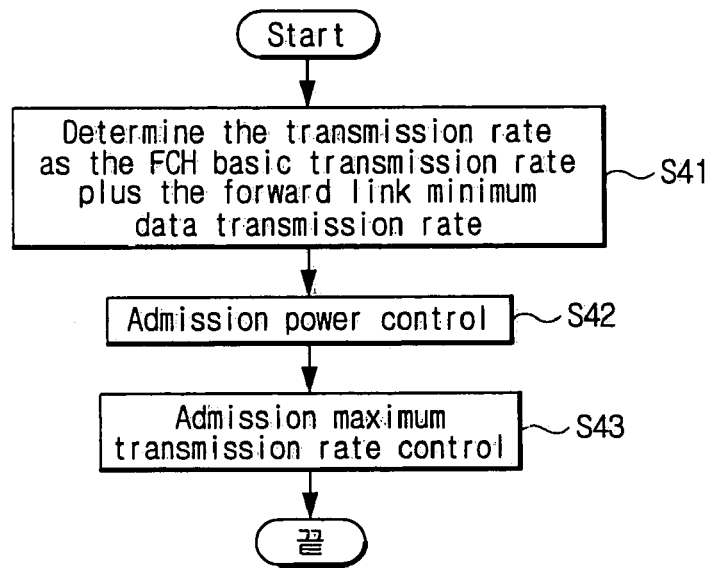
FIG. 6 is a flow chart illustrating the call admission check of FIG. 3 or FIG. 4 in case of a data call.

FIG. 6 shows steps which are preferably performed during a call admission check for the FA assigned at step S20. First, the transmission rate of the QoS parameters to be used in the call admission check is determined as the FCH basic transmission rate (1X) plus the forward link minimum data transmission rate (FWD_MINIMUM_RATE) (S41). Then, upon checking the call admission control related data (e.g., PLD) stored in the database related to the call admission control, it is determined whether the admission power control is to be conducted according to the value of the forward link power control flag (FWD_POWER_CTRL_FLAG) within the data related to the call admission control. Thereafter, if the admission power control is to be conducted, the admission power control is conducted by referring to the forward link power capacity (FWD_POWER_CAPACITY) within the data related to the call admission control (S42).

The reason why the transmission rate of the QoS parameters to be used in the call admission check has the value of the FCH basic transmission rate (1X) plus the forward link minimum data transmission rate (FWD_MINIMUM_RATE) is to guarantee the QoS later at the time of assigning the SCH.

Then, the admission maximum transmission control is conducted in a manner not to exceed the maximum data rate in the sector/FA by using the forward link maximum transmission rate (FWD_MAX_RATE) within the data related to the call admission control (S43).

More specifically, in case of a high rate data call, data rate X 1 would be required as the forward radio band capacity for the FCH. Also, if a DCCH is established, data rate X 1 is used for this purpose. Thus, data rate X 2 is used for establishment of the FCH and the DCCH. In addition, because the high rate data call connection is established based upon the SCH connection, the minimum guaranteed data rate in case of an SCH connection is confirmed from the PLD and then the data rate required for the establishment of the FCH/DCCH is added thereto. In this manner, the data rate required for the establishment of the data call connection is determined.

If the forward SCH is established for a high rate data call, the SCH assignment request message is received from the control station and it is checked whether it is a rate change caused by the new assignment of the SCH or the increase in the data rate. Thereafter, it is checked whether there is sufficient extra capacity in the sector/FA to establish the SCH (i.e., the excess data rate of the sector/FA for which the SCH is to be established is checked). If it is possible to assign the requested SCH data rate, the assignment is conducted.

On the other hand, if the extra data rate is lower than the data rate required for the establishment of the SCH, it is checked whether there are high rate data calls assigned in the sector/FA. If there are such high rate data calls, one that has the highest data rate is selected.

After confirming that the data rate of the selected highest rate data call is higher than the minimum data rate of the PLD and is higher than the data rate of the SCH, the data rate of the selected highest rate data call is decreased by one level. Then, it is checked whether the SCH is assignable in the current situation by using the excess data rate obtained from decreasing the data rate of the selected highest rate data call as mentioned above. If the data rate of a pre-existing high rate data call needs to be decreased, a data call rate decrease request is transmitted to the control station for the decrease of the data call rate.

On the other hand, if there is no high rate data call assigned in the sector/FA or if the data rate of the selected highest rate data call is lower than the data rate of the SCH to be assigned, it is checked whether the data rate of the SCH to be assigned is higher than the minimum data rate specified in the PLD. Then, upon decreasing the data rate of the SCH to be assigned by one level, it is checked whether the SCH can be assigned in the current situation.

If it is not possible to assign the SCH in the current situation, it is checked whether there exists the selected high rate data call having the maximum data rate. If there exists such highest rate data call, it is checked whether the data rate of the selected highest rate data call is higher than the minimum data rate of the PLD and higher than the data rate of the SCH to be assigned. On the other hand, if there exists no selected high rate data call, it is checked whether the data rate of the SCH to be assigned is higher than the minimum data rate specified in the PLD. Then, upon decreasing the data rate of the SCH by one level, it is checked again whether the SCH can be assigned in the current situation.

If the data rate of the selected highest rate data call is higher than the data rate of the SCH, the data rate of the selected high rate data call is lowered as long as it is equal to or greater than the data rate of the SCH to be assigned and equal to or greater than the minimum SCH data rate specified in the PLD. Then, it is checked again whether the SCH can be assigned with the excess capacity obtained therefrom.

In attempting to assign the SCH by decreasing the data rate of the SCH to be assigned or the data rate of a high rate data call which has already been assigned, if it is determined that there is no sufficient capacity, the SCH assignment request is rejected.

Figure 7:
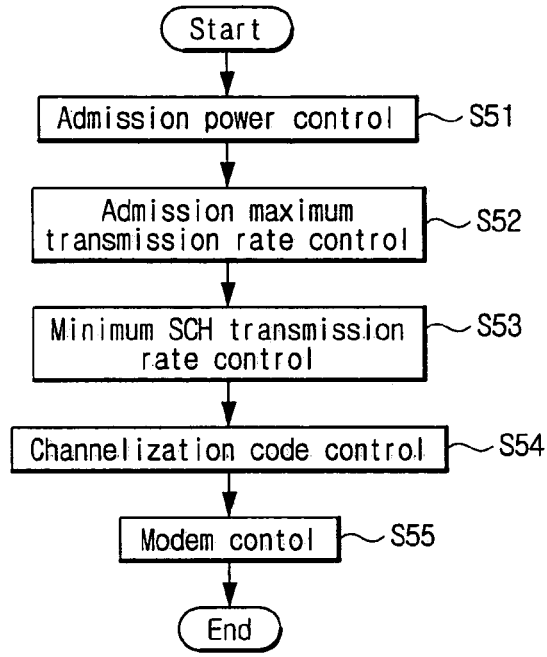
FIG. 7 is a flow chart illustrating the call admission control as shown in FIG. 4.

FIG. 7 shows a preferred manner in which the call admission control step (S29) is performed.

First, upon checking the data related to the call admission control (e.g., PLD) stored in the database related to the call admission control, it is determined whether the admission power control will be conduced according to the value of the forward link power control flag (FWD_POWER_CTRL_FLAG) among the data related to the call admission control. If it is determined that the admission power control is to be conducted, the admission power control is conducted by referring to the forward link power capacity (FWD_POWER_CAPACITY) among the data related to the call admission control (S51).

Thereafter, by using the forward link maximum transmission rate (FWD_MAX_RATE) among the data related to the call admission control, the admission maximum transmission rate control is conducted in a manner not exceeding the maximum data rate in the sector/FA (S52).

Then, the minimum SCH transmission rate control is conducted by referring to the forward link minimum data transmission rate (FWD_MINIMUM_RATE) among the data related to the call admission control so that the minimum SCH data transmission rate may be assigned (S53). The minimum SCH transmission rate control is used when the admission maximum transmission rate control is conducted. Further, if it is not possible to assign the minimum SCH data transmission rate during the call connection, the assignment is attempted in another FA and then the minimum SCH transmission rate control is conducted again for the assignment of the minimum SCH data transmission rate.

Thereafter, upon checking whether there are assignable Walsh resources, if there is no assignable Walsh resource, the Walsh code control is conducted so that any available Walsh resources may be searched for and assigned to the maximum extent (S54).

Then, it is checked whether there are assignable modem resources. If there is no assignable modem resource, the forward modem control is conducted so that any available modem resources may be searched for and assigned to the maximum extent (S55).

Figure 8:
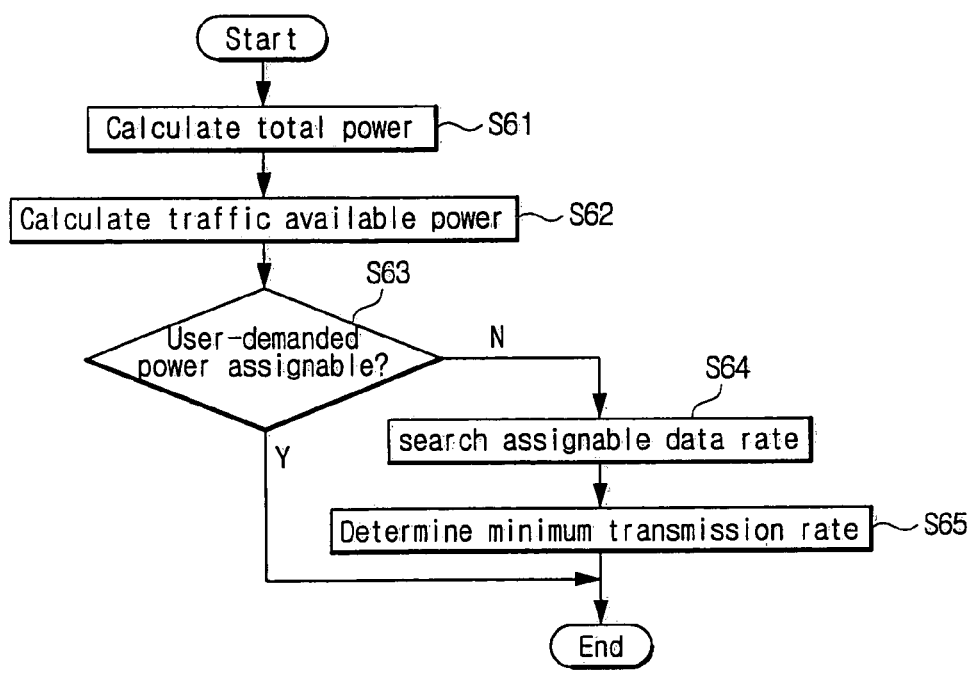
FIG. 8 is a flow chart illustrating the admission power control step shown in FIG. 5 to FIG. 7.

FIG. 8 shows a preferred way in which admission power control (S32, S42 and S51) is performed.

First, the power capacity that may be used in the forward link, i.e., the total power, is calculated (S61). The total power ("TP") may be calculated as follows given the overhead power ("OP") and the forward link power capacity (FWD_POWER_CAPACITY) ("FP").

$$TP=(OP \times 100)/FP \quad (1)$$

The power capacity that may be used as the traffic channel, i.e., the traffic available power, is calculated by using said total power (S62). The traffic available power is calculated by subtracting the overhead power (OP) from said total power (TP).

Then, it is examined whether the power required by the user, i.e., the user request power, may be assigned. This is calculated based upon the power used by active calls in average (i.e., mean power per channel). The mean power ("MP") may be obtained according to the Equation 2. "CP" is the current power and "AN" is the number of active forward modems.

$$MP=(CP-OP)/AN \quad (2)$$

Specifically, it is examined whether the user request power may be assigned by checking whether the traffic available power is equal to or greater than the mean power per channel (MP) multiplied by the user request transmission rate (S63).

If it is determined at step S63 that the user request power cannot be assigned, the maximum assignable data rate is searched as the user request transmission rate is decreased (S64). Here, the minimum transmission rate of the user that attempted the assignment is determined as follows (S65).

In case of the FCH assignment, the minimum transmission rate is determined to be the user request transmission rate. In case of the SCH initial allocation, the minimum transmission rate is determined to be the lesser of the user request transmission rate and the forward link minimum data transmission rate (FWD_MINIMUM_RATE) within the data related to the call admission control. In case of a change in the SCH transmission rate, the minimum transmission rate is determined to be the current transmission rate.

Figure 9:
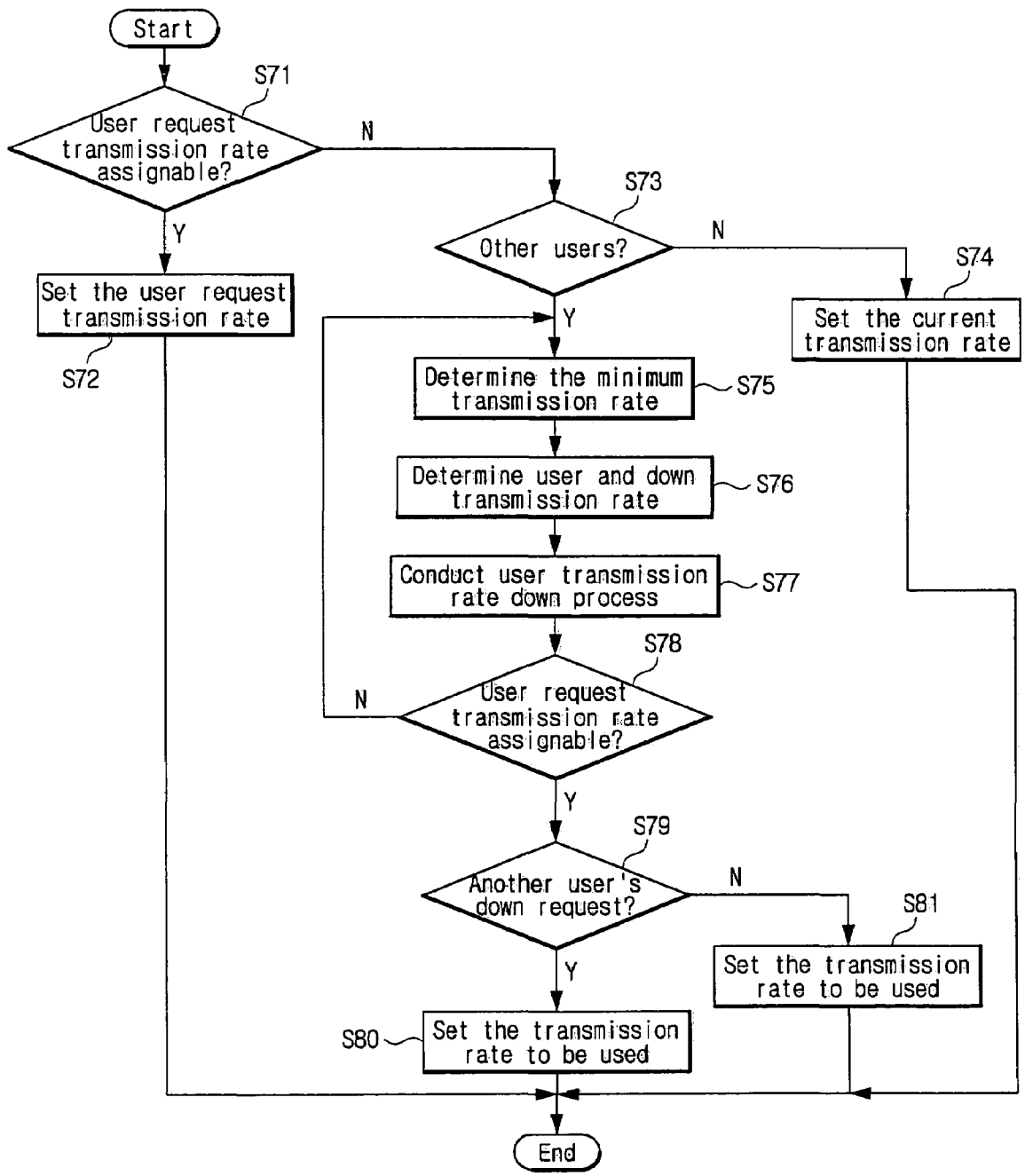
FIG. 9 is a flow chart illustrating the admission maximum rate control step shown in FIG. 5 to FIG. 7.

FIG. 9 shows a preferred way in which admission maximum transmission rate control (S33, S43 and S52) is performed.

First, it is checked whether the user request transmission rate is assignable (S71). If the user request transmission rate is assignable (e.g., if the user request transmission rate does not exceed the forward link maximum transmission rate (FWD_MAX_RATE) among the data related to the call admission control), the user request transmission rate is set as the transmission rate and the admission maximum transmission rate control is finished (S72).

On the other hand, if it is not possible to assign the use request transmission rate, it is examined whether there are other SCH users (S73). If there is no other active SCH user, the current transmission rate is set as the transmission rate and then the control is finished (S74). This indicates that assignment is impossible in case of the initial allocation.

If it is determined at step S73 that there exist other SCH users, the minimum transmission rate of the user attempting the assignment is determined as follows (S75).

In case of the FCH assignment, the minimum transmission rate is determined to be the user request transmission rate. In case of the SCH initial allocation, the minimum transmission rate is determined to be the lesser of the user request transmission rate and the forward link minimum data transmission rate (FWD_MINIMUM_RATE) within the data related to the call admission control. In case of a change in the SCH transmission rate, the minimum transmission rate is determined to be the current transmission rate.

Thereafter, because the user request transmission rate exceeded the forward link maximum transmission rate (FWD_MAX_RATE), either the requesting user attempting the assignment or one of the other active SCH users is selected as a user for which the transmission rate will be down and then the down transmission rate is determined (S76).

Among the requesting user attempting the assignment and the other active users, the user having the greatest transmission rate is selected as the user for which the transmission rate down will be conducted.

Then, the user transmission rate down process is conducted (S77). If the data rate of the requesting user attempting the assignment is greater than the transmission rate of any other active user, the user request transmission rate is decreased to be a half of the original rate so that the transmission rate of the requesting user may satisfy the minimum transmission rate. If one of the other active users has the greater transmission rate, the transmission rate of the relevant active user is decreased to be a half of the original rate so that the transmission rate of such user may satisfy the forward link minimum data transmission rate (FWD_MINIMUM_RATE).

Then, based upon the transmission rate down value, it is checked again whether the forward link maximum transmission rate (FWD_MAX_RATE) is exceeded (S78). If it is determined at this step S78 that the transmission rate down value exceeds the forward link maximum transmission rate (FWD_MAX_RATE), the steps starting from the minimum transmission rate determination S75 are conducted again.

On the other hand, if it is determined at step S78 that the transmission rate down value does not exceed the forward link maximum transmission rate (FWD_MAX_RATE), it is checked whether it is the down request for said other active user (S79). If it is the down request for the other active user, the transmission rate is determined to be the value finally decided after sending the SCH transmission rate down request to the control station (S80).

If the down request is the one for the assignment requesting user, the transmission rate down value becomes the transmission rate to be used by the user (S81).

As explained above, according to the present invention, a call admission control function is conducted in the base station processor, making it possible to satisfy QoS for all users to a maximum extent and reduce the occurrence of the call reject or call drop of voice calls and data calls. Further, through the present invention, the voice call priority may be guaranteed and the database related to the call admission control may easily be adjusted by the system operator according to a relevant cell environment.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A call admission control method in a mobile communication system, comprising:
   determining whether a call arising in the mobile communication system is a voice call or a data call;
   checking whether one or more minimum resources are available;
   performing a voice call priority guarantee function; and
   establishing a maximum supplemental channel (SCH) connection if the call is a data call, wherein, if there is no available resource for the voice call, the method further comprises:
   generating extra resources by reducing a transmission rate of a data call which has already been connected:
   accommodating the voice call with said extra resources; and
   for the data call, generating extra resources by, while maintaining a minimum transmission rate of an SCH designated for the data call, reducing the transmission rate of another data call and establishing the maximum SCH connection with said generated extra resources.

2. A call admission control method in a mobile communication system, comprising:
   determining whether a call arising in the mobile communication system is a voice call or a data call;
   checking whether one or more minimum resources are available;
   performing a voice call priority guarantee function; and
   establishing a maximum supplemental channel (SCH) connection if the call is a data call, wherein said call admission control process comprises:
   confirming that the call that arose in the mobile communication system is a voice call, determining whether there are available modem resources in a frequency assignment (FAI to be used between a relevant mobile station and a base station, and assigning the FA accordingly;
   checking extra capacity in a radio band for a relevant sector/FA and conducting a call admission check accordingly; and
   upon completion of the call admission check, assigning resources according to the determined state of resource availability and establishing the connection for a fundamental channel (FCH) between the mobile station and the base station and establishing the connection for the voice call.

3. The method of claim 2, wherein said call admission check comprises:
   specifying a transmission rate among quality of service (QoS) parameters to be used in the call admission check as a basic transmission rate of the FCH;
   determining whether to conduct admission power control by referring to a database related to call admission control and conducting admission power control accordingly; and controlling an admission maximum transmission rate so as not to exceed a maximum data rate of a relevant sector/FA by referring to the database related to the call admission control.

4. The method of claim 3, wherein the database related to the call admission control comprises: a forward link power control flag, a forward link power capacity, a forward link minimum data transmission rate, and a forward link maximum transmission rate and wherein the database is adjusted according to relevant cell environments.

5. A call admission control method in a mobile communication system, comprising:
   determining whether a call arising in the mobile communication system is a voice call or a data call;
   checking whether one or more minimum resources are available;
   performing a voice call priority guarantee function; and
   establishing a maximum supplemental channel (SCH) connection if the call is a data call, wherein said call admission control process comprises:
   confirming that the call that arose in the mobile communication system is a data call,
   determining whether there are available modem resources in a frequency assignment (FA) to be used between the relevant mobile station and the base station and assigning the FA accordingly;
   checking extra capacity in a radio band for a relevant sector/FA and conducting a call admission check accordingly;
   upon completion of the call admission check, assigning resources according to the determined state of resource availability and establishing a fundamental channel (FCH) and the voice call connection between the mobile station and the base station;
   conducting call admission control, in which a maximum assignable value for a requested data transmission rate is determined in accordance with call admission control parameters; and
   assigning SCH resources at the data transmission rate determined by said call admission control, and establishing the data call connection between the mobile station and the base station.

6. The method of claim 5, wherein said call admission check comprises:
   specifying a transmission rate among quality of service (QoS) parameters to be used in the call admission check as a basic transmission rate of the FCH plus a minimum data transmission rate of the forward link in a database related to the call admission control;

determining whether to conduct admission power control by referring to the database related to the call admission control and conducting admission power control accordingly; and controlling an admission maximum transmission rate so as not to exceed a maximum data rate of a relevant sector/FA by referring to the database related to the call admission control.

7. The method of claim 5, wherein said call admission control comprises:

determining whether to conduct the admission power control by referring to the database related to the call admission control and conducting the admission power control accordingly;

controlling the admission maximum transmission rate so as not to exceed the maximum data rate of the relevant sector/FA by referring to the database related to the call admission control;

controlling minimum SCH transmission rate so that the minimum SCH data transmission rate is assignable by referring to the database related to the call admission control;

checking whether there exists channelization resources that may be assigned and if no relevant channelization resources exist, searching for maximum assignable channelization resources and controlling the channelization code so that such resources may be assigned; and checking whether assignable modem resources exist and if no relevant modem resources exist, searching for maximum assignable modem resources and controlling the modem so that such resources may be assigned.

8. The method of claim 2, wherein if no available modem resources exist in the FA at which the mobile station made or received a call or if said call admission check fails, said call admission control process further comprises searching for an FA which has a least load and assigning this FA.

9. The method of claim 3, wherein said admission power control comprises:

calculating a total power that is available at a link the mobile station and base station and determining traffic available power that is available as a traffic channel using said total power;

checking whether said traffic available power is not less than an average power of channels multiplied by a user request transmission rate, and examining whether the user request power may be assigned; and if the user request power cannot be assigned, finding a maximum assignable data rate while reducing said user request transmission rate and thereby determining the minimum transmission rate for the relevant user attempting the assignment.

10. The method of claim 3, wherein said admission maximum transmission rate control comprises:

checking whether a user request transmission rate exceeds a maximum transmission rate of a forward link within the database related to said call admission control, and checking whether it is possible to assign the user request transmission rate;

if the user request transmission rate cannot be assigned, examining whether there are any other active SCH users and determining a minimum transmission rate of the user attempting the assignment;

selecting one user from the user attempting to receive assignment and the other active SCH users and determining said selected user as the user whose transmission rate will be decreased, and then determining a down transmission rate and thereby conducting the user transmission rate down process;

checking again whether the maximum transmission rate of the forward link is exceeded by applying the down transmission rate determined according to said user transmission rate down process; and if said down transmission rate does not exceed the maximum transmission rate of the forward link, confirming that the down request is for the selected other active SCH user and performing the requested SCH transmission rate decrease and specifying a finally determined value as the transmission rate to be used by the user.

11. The method of claim 9, wherein said determination of the minimum transmission rate includes: specifying the user request transmission as the minimum transmission rate in case of FCH assignment, by specifying a lesser of the user request transmission rate and the minimum data transmission rate of the forward link among the data related to said all admission control as the minimum transmission rate in case of the SCH initial assignment, or by specifying a currently specified transmission rate as the minimum transmission rate in case of the SCH transmission rate change.

12. A call admission control method in a mobile communication system, comprising:

confirming at a time of a call connection request that a call is a data call request;

determining whether there are available modem resources in a frequency assignment (FA) to be used between the relevant mobile station and the base station and then assigning the FA accordingly;

checking extra capacity in a radio band for a relevant sector/FA and conducting a call admission check accordingly;

upon the completion of the call admission check, assigning resources according to the determined state of resource availability and thus establishing connection for a fundamental channel (FCH) between the mobile station and the base station and establishing the connection for the voice call;

conducting a call admission control function, in which a maximum assignable value for a requested data transmission rate is determined in accordance with call admission control parameters; and assigning SCH (Supplemental Channel) resources at the data transmission rate determined by said call admission control and thus establishing the data call connection between the mobile station and the base station.

13. The method of claim 12, further comprising, at the time of the call connection request, if the call is a voice call:

determining whether there are available modem resources in the FA to be used between the relevant mobile station and the base station and then assigning the FA accordingly;

checking extra capacity in the radio band for the relevant sector/FA and conducting the call admission check accordingly; and upon the completion of the call admission check, assigning resources according to the determined state of resource availability and thus establishing the connection for the fundamental channel (FCH) between the mobile station and the base station and establishing the connection for the voice call.

* * * * *